United States Patent
Kim

[11] Patent Number: 5,942,865
[45] Date of Patent: Aug. 24, 1999

[54] DRIVING APPARATUS OF A SWITCHED RELUCTANCE MOTOR

[75] Inventor: Sung-Lyeol Kim, Suwon, Rep. of Korea

[73] Assignee: Samsung Electronics, Co., Ltd., Suwon, Rep. of Korea

[21] Appl. No.: 08/912,986

[22] Filed: Aug. 12, 1997

[30] Foreign Application Priority Data

Nov. 1, 1996 [KR] Rep. of Korea .................. 96-51544

[51] Int. Cl.$^6$ .................................................. H02K 23/00
[52] U.S. Cl. ...................................... 318/254; 318/701
[58] Field of Search ............................... 318/701, 254

[56] References Cited

U.S. PATENT DOCUMENTS

| | | | |
|---|---|---|---|
| 4,644,239 | 2/1987 | Yoshikawa et al. ................ | 318/641 |
| 5,192,902 | 3/1993 | Mizumoto et al. ................ | 318/561 |
| 5,319,291 | 6/1994 | Ramirez ................................ | 318/254 |
| 5,754,024 | 5/1998 | Sugiyama ............................ | 318/701 |

*Primary Examiner*—Brian Sircus
*Attorney, Agent, or Firm*—Burns, Doane, Swecker & Mathis, L.L.P.

[57] ABSTRACT

The present invention relates to a driving apparatus of a switched reluctance motor, wherein a first, second and third delayer (24-1, 24-2, 24-3) delay for a predetermined time A phase, B phase and C phase rotor position signals output from A phase, B phase and C phase position sensors (22-1, 22-2, 22-3) to thereby output gate signals of lower switching elements (Q2, Q4, Q6) of switched reluctance motor driving circuit respectively, so that the lower switching elements (Q2, Q4, Q6) is turned off later by a predetermined time than upper switching elements (Q1, Q3, Q5), thereby offsetting and reducing radial force generated when the upper switching elements (Q1, Q3, Q5) and the lower switching elements (Q2, Q4, Q6) are turned off for decrease of noise at the switched reluctance motor.

4 Claims, 6 Drawing Sheets

DRIVING APPARATUS OF A SWITCHED RELUCTANCE MOTOR

BACKGROUND OF THE INVENTION

1. Field of the Invention

The present invention relates to a switched reluctance motor (SRM), and more particularly to a driving apparatus of the SRM for reducing a radial force which is generated when the SRM is driven.

2. Description of the Prior Art

In general, switched reluctance motors (SRMS) include, as shown in FIG. 1, a stator 2 and a rotor 4, wherein the stator 2 has three pairs of poles +A and –A, +B and –B, and +C and –C (or, salient pole C) on which A phase coil 6, B phase coil 8, and C phase coil 10 are respectively wound.

A driver for the SRM thus constructed consists of, as shown in FIG. 2, a smoothing capacitor C for producing a direct current (DC) voltage, a plurality of switching elements Q1 to Q6 for applying the voltage to the respective phase coils 6, 8, and 10, 6 diodes D1 to D6 for feedback of a back electromotive force created at the time of turning-off of the respective switching elements Q1 to Q6 after applying the voltage to each said phase coil.

The switching operation of the A-phase switching elements Q1 and Q2 may be controlled by a signal produced from a gate signal generating unit. This unit includes, as shown in FIG. 3, an oscillator 12 which outputs a Pulse Width Modulated (PWM) signal, an AND logic gate 16 which produces a logic product of said produced PWM signal and a position information signal available from an A phase position sensor 14 when the rotor 4 faces with A phase pole of the stator 2, wherein the signal from the AND logic gate 16 is applied to an upper A phase switching element Q1, and wherein the position information signal from the A phase position sensor 14 is applied to a lower A phase switching element Q2.

An application of a power to the A phase of the SRM may be made by giving operational signals to the gate of A phase-related switching elements Q1, Q2. The activated switching elements Q1, Q2 allow electric current to flow through the A phase coil of the stator 2, resulting in magnetization of the poles +A and –A of the stator. Such magnetized poles pull the rotor 4 positioned near the A phase pole.

B and C phase coils 8 and 10 also operate as in A phase-related action, similarly, wherein the order of A, b and C phase for the magnetization of the stator 2 is maintained, by which the motor can continue to rotate.

However, when the switching elements are turned off, the conventional SRM as described above generates a radial force causing a loud noise. In particular, the greater radial force is generated when both upper and lower switching elements are turned off at the same time.

Meanwhile, there is disclosed in Japanese laid open utility model application No. Hei 2-123997 another driver for the SRM. In the driver which conducts in a predetermined order phase-windings provided with each phase pole to create torque applied to salient pole, the driver includes position detecting means for detecting two relative positions of a salient pole of a rotor, which are determined in advance, time measuring means for measuring a time period lapsed after the detection of initial relative positions by the position detecting means, and conduction control means that initiates the conduction to said phase windings at earlier detected time point and stops conducting to the phase windings at later detected time point.

Accordingly, when rotary speed of SRM is reduced, a rotary angle of initiated conduction at an upper winding moves toward a forward angle and when the rotary speed is increased, the rotary angle of the initiated conduction moves toward a retarded angle, to thereby restrict changes of rotary speed according to load variation.

SUMMARY OF THE INVENTION

The present invention is disclosed to solve the aforementioned problems and it is an object of the present invention to provide a driving apparatus of a switched reluctance motor for reducing a radial force which is generated when the SRM is driven.

In accordance with the object of the present invention, there is provided a driving apparatus of a switched reluctance motor, the apparatus comprising:

- a pulse width modulation (PWM) signal generator for generating a PWM signal;
- a position sensor for detecting a position of a rotor to generate a rotor position signal;
- an upper gate control signal generator for combining the PWM signal with the rotor position signal to thereby generate a gate control signal of upper switching element; and
- a lower gate control signal generator for receiving the rotor position signal to generate a gate control signal of a lower switching element extented more by a predetermined time than a gate control signal of the upper switching element.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Now, preferred embodiment of the present invention will be described in detail with reference to the accompanying drawings.

Figure 1:
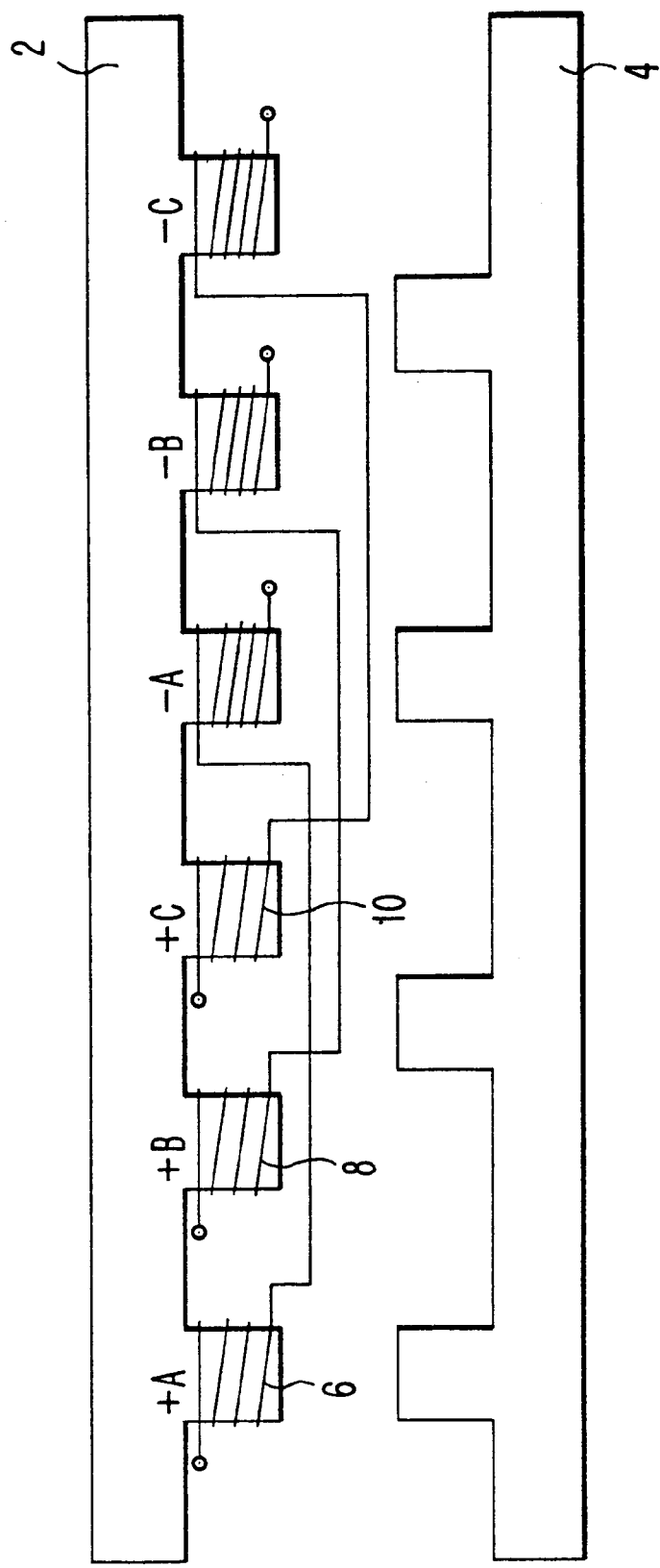
FIG. 1 is a schematic diagram for illustrating a general switched reluctance motor.
Figure 2:
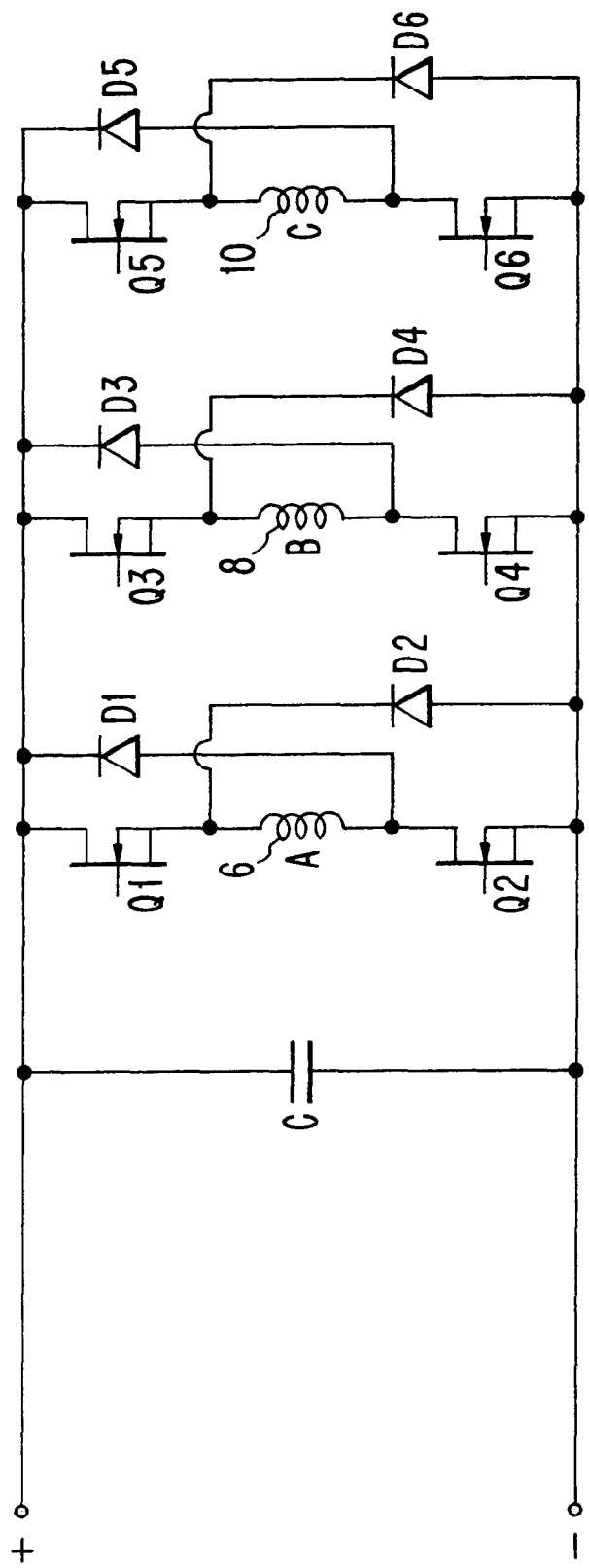
FIG. 2 is a driving circuit diagram of a conventional switched reluctance motor.
Figure 3:
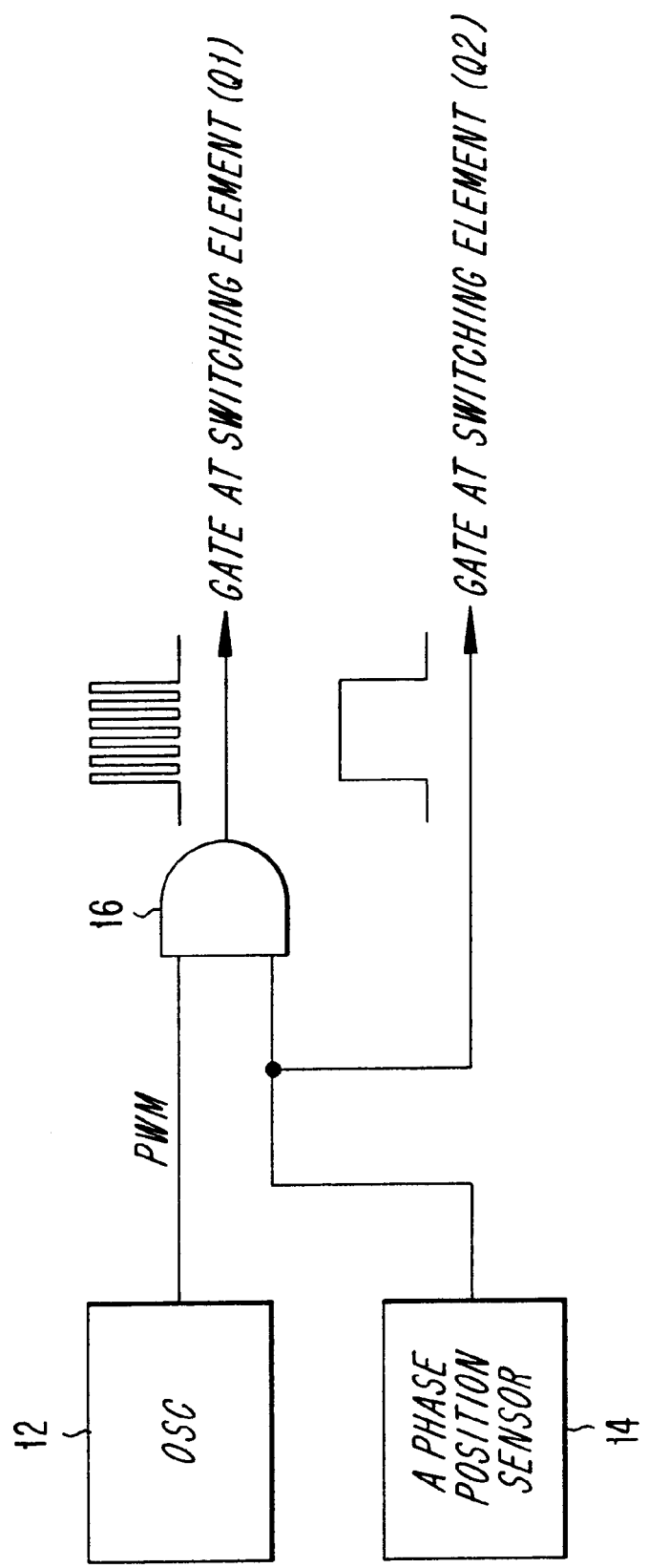
FIG. 3 is a schematic block diagram for illustrating a gate control circuit of a switching element shown in FIG. 2.
Figure 4:
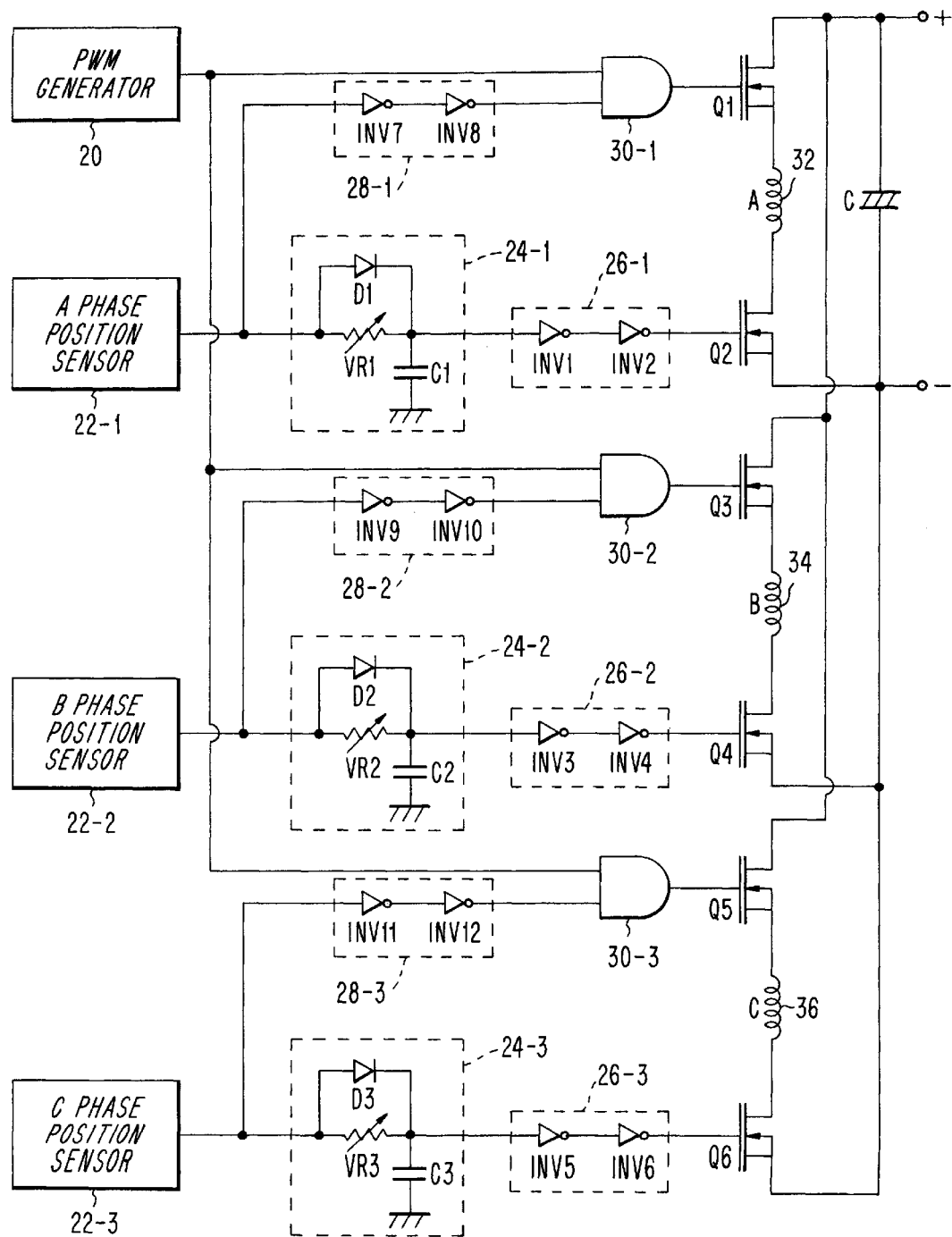
FIG. 4 is a circuit diagram of a driving apparatus at a switched reluctance motor according to the present invention.

FIG. 4 is a circuit diagram of a driving apparatus at a switched reluctance motor according to the present invention, where the apparatus includes a PWM signal generator 20, A phase position sensor (22-1), B phase position sensor (22-2), C phase position sensor (22-3), first, second and third delayer (24-1, 24-2 and 24-3), first, second and third inverter units (26-1, 26-2 and 26-3), fourth, fifth and sixth inverter units (28-1, 28-2 and 28-3), and first, second and third AND logic gate (30-1, 30-2 and 30-3).

The PWM signal generator 20 is designed to generate a PWM signal and to output same, and the A phase, B phase and C phase position sensors (22-1, 22-2 and 22-3) are respectively disposed at A phase pole, B phase pole and C phase pole of a stator, so that when a rotor (not shown) is positioned at A phase pole, B phase pole and C phase pole, the sensors detect the position the rotor is placed on and generate A phase, B phase and C phase rotor position signals respectively.

The first, second and third delayers (24-1, 24-2 and 24-3) include first, second and third diodes (D1, D2 and D3) respectively connected in forward direction between output terminals of the A phase, B phase and C phase position sensors (22-1, 22-2 and 22-3) and input terminals of the first, second and third inverter units (26-1, 26-2 and 26-3), first, second and third variable resistors (VR1, VR2, VR3) respectively connected in parallel to the first, second and third diodes (D1, D2, D3) and first, second and third capacitors (C1, C2, C3) respectively connected at one end thereof in common to output terminals of the diodes (D1, D2, D3) and variable resistors (VR1, VR2, VR3) and respectively connected at the other end thereof to ground, so that A phase, B phase and C phase rotor position signals output from the A phase, B phase and C phase position sensors (22-1, 22-2, 22-3) can be delayed and output.

Furthermore, the first, second and the third variable resistor (VR1, VR2, VR3) serve to adjust lengths of A phase, B phase and C phase rotor position signals delayed by the diodes (D1, D2, D3), and serve to adjust lengths of A phase, B phase and C phase rotor position signals which have resistor values thereof varied by external manipulation and which are delayed by the first, second and third diodes (D1, D2, D3).

The first, second and third inverter units (26-1, 26-2, 26-3) include inverters (INV1, INV2), (INV3, INV4), (INV4, INV5) which are respectively connected in series, and serve to twice invert the signals respectively delayed and output from the first, second and third delayers (24-1, 24-2, 24-3) to make same in rectangular waves, where the rectangular waves are respectively output as gate signals of lower switching elements (Q2, Q4, Q6).

Furthermore, the fourth, fifth and sixth inverter units (28-1, 28-2, 28-3) include inverters (INV7, INV8), (INV9, INV10), (INV11, INV12) which are respectively connected in series, and serve to twice invert the signals output from the A phase, B phase and C phase position sensors (22-1, 22-2, 22-3) to make same in rectangular waves, where the rectangular waves are output in first, second and third AND logic gates (30-1, 30-2, 30-3).

The first, second and third AND logic gates (30-1, 30-2, 30-3) serve to perform a logical product of the PWM signals output from the PWM signal generator 20 and the signals output from the fourth, fifth and sixth inverter units (28-1, 28-2, 28-3) to respectively output gate signals of upper switching elements (Q1, Q3, Q5) at a switched reluctance motor driving circuit.

Now, operational effect of the driving apparatus of the switched reluctance motor according to the present invention thus constructed will be described in detail with reference to the accompanying drawings in FIGS. 5, 6 and 7.

The A phase, B phase and C phase position sensors (22-1, 22-2, 22-3) disposed at the switched reluctance motor are adapted to detect the rotors respectively positioning at the A phase pole, B phase pole and C phase pole of the stator to thereafter output A phase, B phase and C phase rotor position signals respectively.

The first, second and third delayers (24-1, 24-2, 24-3) serve to delay the A phase, B phase and C phase rotor position signals to respectively output same to the first, second and third inverter units (26-1, 26-2, 26-3).

In other words, the first, second and third diodes (D1, D2, D3) of the first, second and third inverter units (26-1, 26-2, 26-3) respectively delay the phase, B phase and C phase rotor position signals output from the A phase, B phase and C phase position sensors (22-1, 22-2, 22-3) and output same, while the first, second and the third variable resistors (VR1, VR2 and VR3) are to adjust delayed lengths of the A phase, B phase and C phase rotor position signals delayed by the first, second and the third diodes (D1, D2, D3) and can adjust the lengths of the A phase, B phase and C phase rotor position signals delayed by the first, second and the third diode (D1, D2, D3) and varied of resistor values thereof by external manipulation.

First, second and third capacitors (C1, C2, C3) at the first, second and to the third inverter units (26-1, 26-2, 26-3) maintain the A phase, B phase and C phase rotor position signals delayed via the diodes (D1, D2, D3) and variable resistors (VR1, VR2, VR3) to thereafter input same to the first, second and the third inverter units (26-1, 26-2, 26-3).

Furthermore, the first, second and the third inverter units (26-1, 26-2, 26-3) twice invert the signals output from the first, second and the third delayers (24-1, 24-2, 24-3) to thereby shape same in rectangular waves and to thereafter input gate signals of the lower switching elements (Q2, Q4, Q6) of the switched reluctance motor driving circuit.

Meanwhile, the fourth, fifth and sixth inverter units (28-1, 28-2, 28-3) twice invert the signals output from the A phase, B phase and C phase position sensors (22-1, 22-2, 22-3) to output same. The reason of using the fourth, fifth and sixth inverter units (28-1, 28-2, 28-3) is to correspond the starting points of the gate signals input into the upper switching elements (Q1, Q3, Q5) of the switched reluctance motor driving circuit with those of the gate signals input into the lower switching elements (Q2, Q4, Q6).

The first, second and the third AND logic gates (30-1, 30-2, 30-3) serve to perform logical product on the PWM signals output from the PWM signal generator 20 and respective signals output from the fourth, fifth and sixth inverter units (28-1, 28-2, 28-3) to thereby generate gate signals of upper switching elements (Q1, Q3, Q5) at the switched reluctance motor driving circuit.

Figure 5:
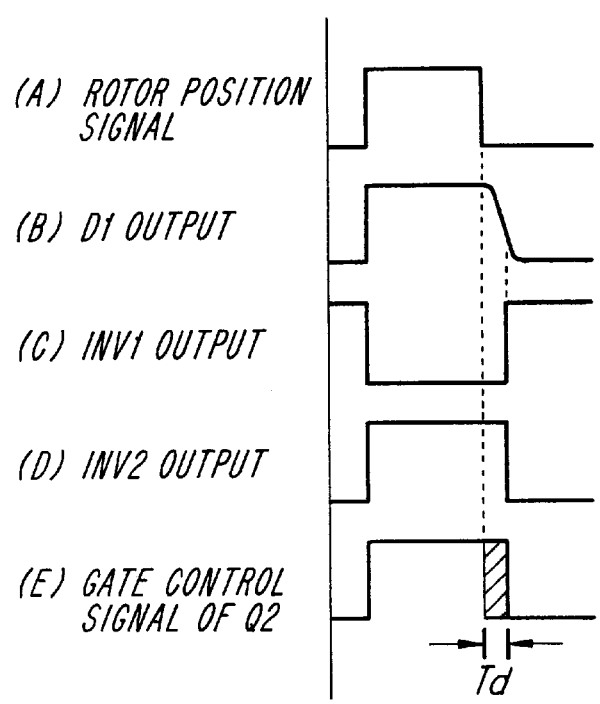
FIG. 5 is a waveform diagram for illustrating a process how a gate control signal of a lower switching element at a driving apparatus of a switched reluctance motor is generated according to the present invention.
Figure 6:
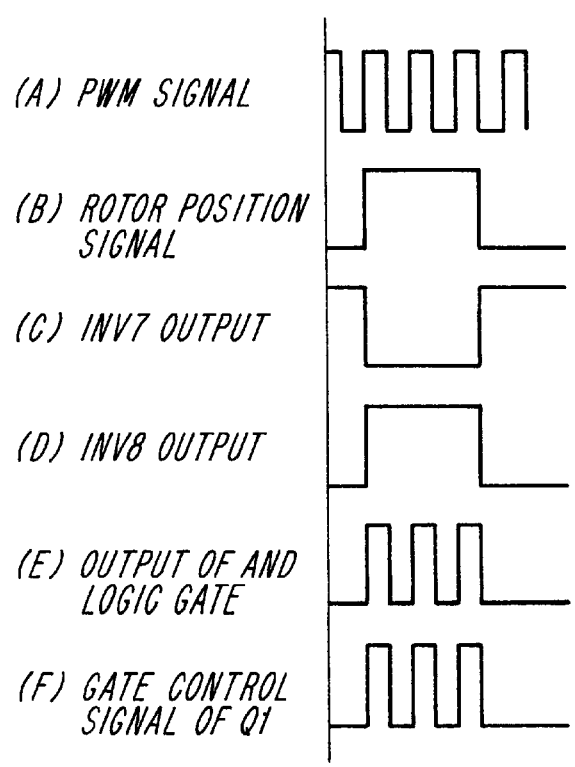
FIG. 6 is a waveform diagram for illustrating a process how a radial force is reduced at a driving apparatus of a switched reluctance motor according to the present invention.
Figure 7:
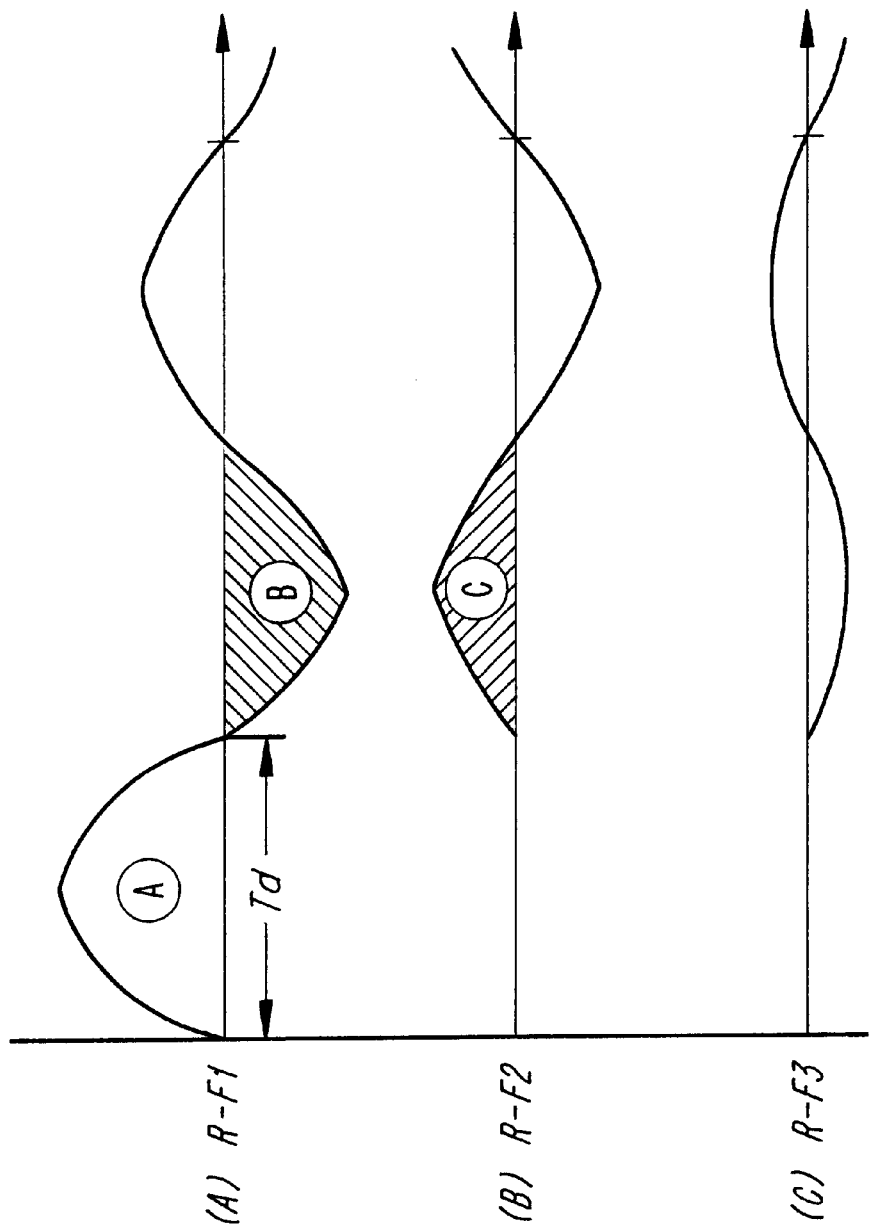
FIG. 7 is a waveform diagram for illustrating a process how a radial force is reduced at a driving apparatus of a switched reluctance motor according to the present invention.

FIG. 5 is a waveform diagram for illustrating a process how a gate control signal of a lower switching element at a driving apparatus of a switched reluctance motor is generated according to the present invention and FIG. 6 is a waveform diagram for illustrating a process how a gate control signal of an upper switching element at a driving apparatus of a switched reluctance motor is generated according to the present invention and FIG. 7 is a waveform diagram for illustrating a process how a radial force is reduced at a driving apparatus of a switched reluctance motor according to the present invention, wherein an A phase rotor position signal output from the A phase position sensor (22-1) shown in FIG. 5(A) passes through the Diode (D1) of the first delayer (24-1) to thereafter be delayed as shown in FIG. 5(B).

At this time, wide delayed by the diode (D1) is adjusted in size thereof by the variable resistor (VR1) and "off" point of the lower switching element (Q2) is determined by length of the width delayed in the above.

The signal adjusted in width thereof and delayed by the variable resistor (VR1) as described in the above is maintained by the capacitor (C1), and the maintained signal is inverted by the first inverter (INV1) to thereafter be output as illustrated in FIG. 5(C).

In other words, the first inverter (INV1) serve to shape the signal input from the first delayer (24-1) according to a self logic level to thereby generate a rectangular wave.

The signal output from the first inverter (INV2) is again inverted by the second inverter (INV2) to thereby be output as a signal illustrated in FIG. 5(D), which is then input as a gate control signal of the lower switching element (Q2) at the switched reluctance motor driving circuit.

At this time, as illustrated is FIG. 5(E), the gate control signal of the lower switching element (Q2) is delayed more by as much as a predetermined time (Td) than the A phase rotor position signal.

Meanwhile, while the gate signal of the lower switching element (Q2) at the switched reluctance motor driving circuit is input as per the abovementioned process, the A phase rotor position signal output from the A phase position sensor (22-1) is input into the fourth inverter unit (28-1).

The inverter (INV7) of the fourth inverter unit (28-1) is adapted to invert the A phase rotor position signal, as illustrated in FIG. 6(B), to thereafter output a signal illustrated in FIG. 6(C).

Furthermore, the inverter (INV8) of the fourth inverter unit (28-1) serves to invert an input signal illustrated in FIG. 6(C) to thereafter output a signal illustrated in FIG. 6(D).

Still furthermore, the first AND logic gate (30-1) serves to perform a logical product of a PWM signal output from the PWM signal generator (20) as illustrated in FIG. 6(A) and a signal output from the fourth inverter unit (28-1) to thereby generate a PWM signal as illustrated in FIG. 6(E), which is then input as a gate control signal of the upper switching element (Q1) at the switched reluctance motor driving circuit as illustrated in FIG. 6(F).

According to the present invention, the length of the gate control signal of the upper switching element (Q1) thus described is shorter than that of the gate control signal of the lower switching element (Q2), so that the upper switching element (Q1) is rendered inactive faster than the lower switching element (Q2).

At this time, a radial force (R-F1) such as A portion illustrated in FIG. 7(A) is generated between a point where the upper switching element (Q1) is rendered inactive and a point where the lower switching element (Q2) is rendered inactive, where the lower switching element (Q2) is delayed more by a predetermined time (Td) than the upper switching element (Q1) and then rendered inactive, thereby generating a radial force (R-F2) such as C portion shown in FIG. 7(B).

Successively, the radial force generated when the upper switching element (Q1) and the lower switching element (Q2) are rendered inactive, are mutually offset to thereby be reduced to a radial force as shown in FIG. 7(C).

As described in the above-mentioned description, the points where the upper switching element (Q1) and the lower switching element (Q2) are rendered inactivated are controlled, to cause a radial force to be generated at a mutually different point for reduction in size thereof.

In other words, a mutual offset is realized between the radial force generated when the upper switching element (Q1) is turned off after current is supplied to A phase coil wound on a stator of switched reluctance motor and the radial force generated when the lower switching element (Q2) is delayed more by a predetermined time (Td) than the upper switching element (Q1) to thereby be turned off, so that the radial forces are decreased to reduce noise of the switched reluctance motor.

When A phase is completed in operation thereof, B phase and C phase are operated in the same procedure as that of the A phase, and when the switched reluctance motor is kept rotating, continuously decreased radial force is activated to thereby reduce the noise of the switched reluctance motor generated by the radial force.

As apparatus from the foregoing, there is an advantage in the driving apparatus of a switched reluctance motor thus described in that the radial force is reduced generated by the switched reluctance motor to thereby decrease the noise of the switched reluctance motor.

What is claimed is:

1. A driving apparatus of a switched reluctance motor, the apparatus comprising:

a pulse width modulation (PWM) signal generator for generating a PWM signal;

a position sensor for detecting a position of a rotor to generate a rotor position signal;

an upper gate control signal generator for combining the PWM signal with the rotor position signal to thereby generate a gate control signal of upper switching element; and a lower gate control signal generator for receiving the rotor position signal to generate a gate control signal of a lower switching element a predetermined time after the gate control signal of the upper switching element wherein the lower gate control signal generator comprises:

a delayer for delaying the rotor position signal for a predetermined time to thereafter output same; and a first inverter unit for twice inverting a signal output from the delayer to shape same into a rectangular wave and to output a gate signal of the lower switching element.

2. The apparatus as defined in claim 1, wherein the upper gate control signal generator comprises:

a second inverter unit for twice inverting the rotor position signal and outputting same in order to make coincident a point where a gate signal of the upper switching element starts with a point where a gate signal of the lower switching element starts; and an AND logic gate for performing a logical product of a PWM signal output from the PWM signal generator and a signal output from the second inverter unit to thereby input a gate signal of the upper switching element.

3. The apparatus as defined in claim 2, wherein the delayer comprises:

a diode forwardly connected between an output terminal of the position sensor and an input terminal of the first inverter unit;

a resistor connected in parallel to the diode; and a capacitor connected in common at one end of said parallel connected diode and resistor to output terminals of the diode and the resistor and to an input terminal of the first inverter unit and connected at the other end thereof to ground.

4. The apparatus as defined in claim 3, wherein the resistor is a variable resistor which can be adjusted in resistance value by a user.

\* \* \* \* \*